United States Patent
Gordon et al.

(10) Patent No.: US 10,168,700 B2
(45) Date of Patent: Jan. 1, 2019

(54) CONTROL OF AN AERIAL DRONE USING RECOGNIZED GESTURES

(71) Applicant: INTERNATIONAL BUSINESS MACHINES CORPORATION, Armonk, NY (US)

(72) Inventors: Michael S. Gordon, Yorktown Heights, NY (US); James R. Kozloski, New Fairfield, CT (US); Ashish Kundu, Elmsford, NY (US); Peter K. Malkin, Ardsley, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 15/041,313

(22) Filed: Feb. 11, 2016

(65) Prior Publication Data

US 2017/0235308 A1     Aug. 17, 2017

(51) Int. Cl.
*B64C 39/02* (2006.01)
*G05D 1/00* (2006.01)
*G08G 5/04* (2006.01)

(52) U.S. Cl.
CPC ......... *G05D 1/0088* (2013.01); *B64C 39/024* (2013.01); *G05D 1/0016* (2013.01); *G05D 1/0027* (2013.01); *G05D 1/0094* (2013.01); *B64C 2201/127* (2013.01); *B64C 2201/141* (2013.01); *B64C 2201/146* (2013.01)

(58) Field of Classification Search
CPC .. G05D 1/0088; G05D 1/0027; G05D 1/0016; G05D 1/0094; B64C 39/024; B64C 2201/141; B64C 2201/127; G08G 5/045
See application file for complete search history.

(56) References Cited

U.S. PATENT DOCUMENTS

| | | | | |
|---|---|---|---|---|
| 8,346,391 B1* | 1/2013 | Anhalt | ...................... | B25J 9/163 700/245 |
| 8,577,535 B2 | 11/2013 | Cummings et al. | | |
| 9,367,067 B2* | 6/2016 | Gilmore | ................. | G05D 1/101 |
| 9,870,716 B1* | 1/2018 | Rao | ..................... | G09B 19/0092 |
| 2004/0143602 A1* | 7/2004 | Ruiz | ..................... | G08B 13/122 |
| 2009/0222149 A1* | 9/2009 | Murray | ................... | A63H 30/04 701/2 |
| 2012/0260220 A1* | 10/2012 | Griffin | .................... | G06F 3/033 715/863 |

(Continued)

OTHER PUBLICATIONS

FunkerTactical; Standardized Hand Signals; Mar. 3, 2014 (Year: 2014).*
P. Mell et al., "The Nist Definition of Cloud Computing", National Institute of Standards and Technology, Information Technology Laboratory, Sep. 2011, pp. 1-7.

(Continued)

*Primary Examiner* — Alan D Hutchinson
(74) *Attorney, Agent, or Firm* — Law Office of Jim Boice

(57) ABSTRACT

A method, system, and/or computer program product controls movement and adjusts operations of an aerial drone. A drone camera observes an aerial maneuver physical gesture by a user. The aerial drone then performs an aerial maneuver that correlates to the aerial maneuver physical gesture. The drone camera observes the user performing a physical action. One or more processors associate the physical action with a particular type of activity. A drone on-board computer adjusts an operation of an aerial drone based on the particular type of activity.

19 Claims, 7 Drawing Sheets

(56) References Cited

U.S. PATENT DOCUMENTS

| | | | |
|---|---|---|---|
| 2013/0253733 A1 | 9/2013 | Lee et al. | |
| 2013/0289858 A1* | 10/2013 | Mangiat | G05D 1/0027 701/117 |
| 2014/0008496 A1 | 1/2014 | Ye et al. | |
| 2014/0063055 A1 | 3/2014 | Osterhout et al. | |
| 2014/0111332 A1* | 4/2014 | Przybylko | G06Q 10/00 340/539.1 |
| 2015/0002391 A1 | 1/2015 | Chen | |
| 2015/0157272 A1* | 6/2015 | Balakrishnan | A61B 5/7246 600/595 |
| 2015/0210388 A1* | 7/2015 | Criado | B64C 39/10 701/3 |
| 2016/0065984 A1* | 3/2016 | Nejat | H04N 5/144 348/231.3 |
| 2016/0088286 A1* | 3/2016 | Forsythe | G06F 17/30528 348/46 |
| 2016/0127641 A1* | 5/2016 | Gove | G06T 1/0007 348/143 |
| 2016/0221683 A1* | 8/2016 | Roberts | B64D 27/02 |
| 2016/0274578 A1* | 9/2016 | Arwine | G05D 1/0011 |

OTHER PUBLICATIONS

Anonymous, "Omnidirectional Control of Teleconference Device via Visual Perception of User Gestures", ip.com, IPCOM000206881, No Date, pp. 1-3.

Anonymous, "Improved Interaction Technique for Scanning Information on Touch Screens", ip.com, IPCOM000228819, No Date, pp. 1-3.

Nahapetyan, V., et al, "Gesture Recognition in the Problem of Contactless Control of an Unmanned Aerial Vehicle", Optoelectronics, Instrumentation and Data Processing, vol. 51, No. 2, Mar. 2015, pp. 192-197.

Urban, M., et al., "Recognition of Arm Gestures Using Multiple Orientation Sensors: Repeatability Assessment", The 7th International IEEE Conference on Intelligent Transportation Systems, IEEE, 2004, pp. 553-558.

Urban, M., et al., "Recognition of Arm Gestures Using Multiple Orientation Sensors", Technical Report, Automated Learning Group, National Center for Supercomputing Applications, Jul. 20, 2004, pp. 1-16.

* cited by examiner

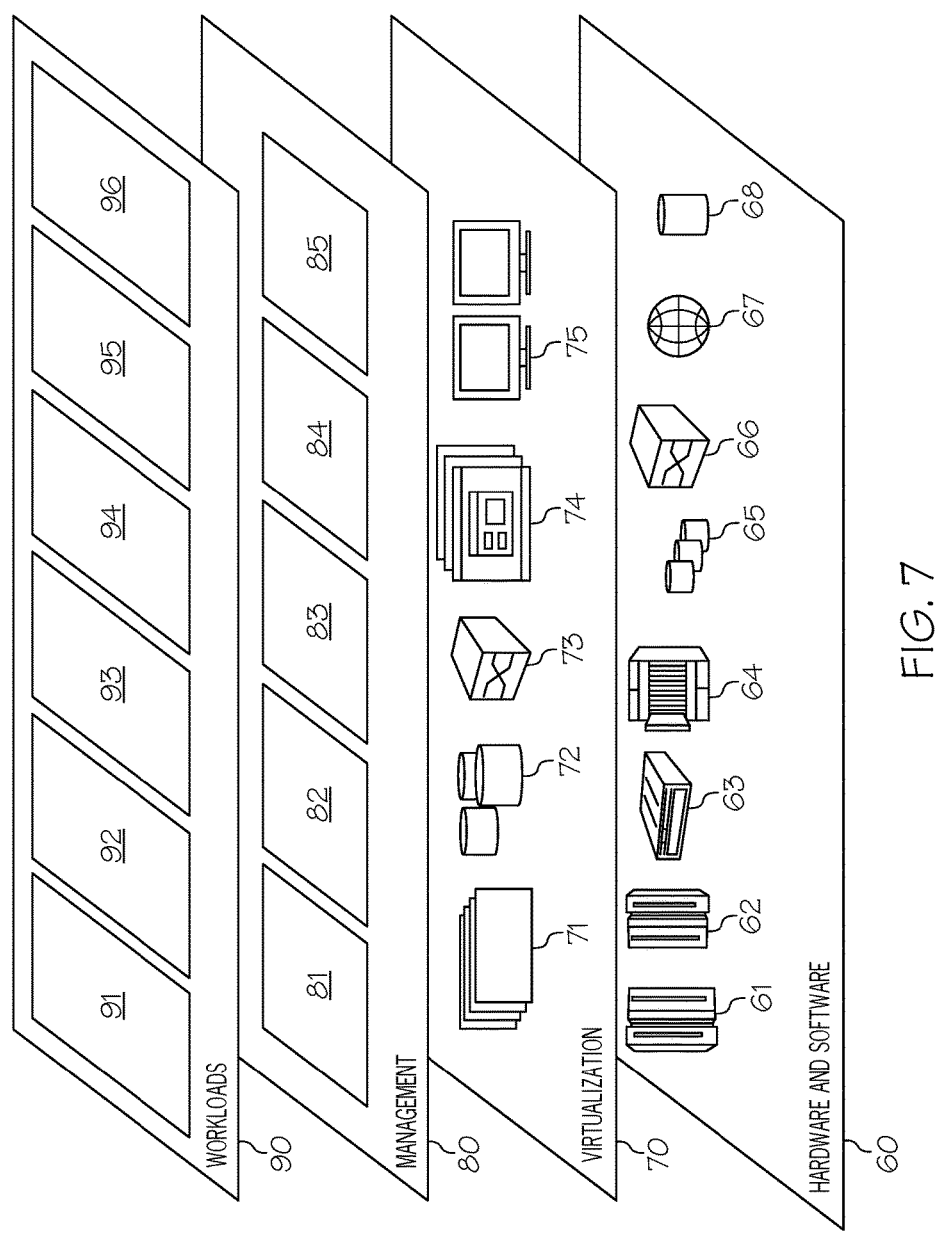

CONTROL OF AN AERIAL DRONE USING RECOGNIZED GESTURES

BACKGROUND

The present disclosure relates to the field of aerial drones, and specifically to aerial drones that are under the control of a user. More specifically, the present disclosure relates to controlling an aerial drone by a user making physical gestures that are visually recognized by the aerial drone.

An aerial drone is an unmanned aircraft, also known as an unmanned aerial vehicle (UAV). That is, an aerial drone is an airborne vehicle that is capable of being piloted without an on-board human pilot. If autonomously controlled using an on-board computer and pre-programmed instructions, a UAV is called an autonomous drone. If remotely piloted by a human pilot, the UAV is called a remotely piloted aircraft (RPA).

SUMMARY

A method, system, and/or computer program product controls movement and adjusts operations of an aerial drone. A drone camera observes an aerial maneuver physical gesture by a user. The aerial drone then performs an aerial maneuver that correlates to the aerial maneuver physical gesture. The drone camera observes the user performing a physical action. One or more processors associate the physical action with a particular type of activity. A drone on-board computer adjusts an operation of an aerial drone based on the particular type of activity.

BRIEF DESCRIPTION OF THE DRAWINGS

FIG. 7 depicts abstraction model layers of a cloud computer environment according to an embodiment of the present invention.

DETAILED DESCRIPTION

Figure 1:
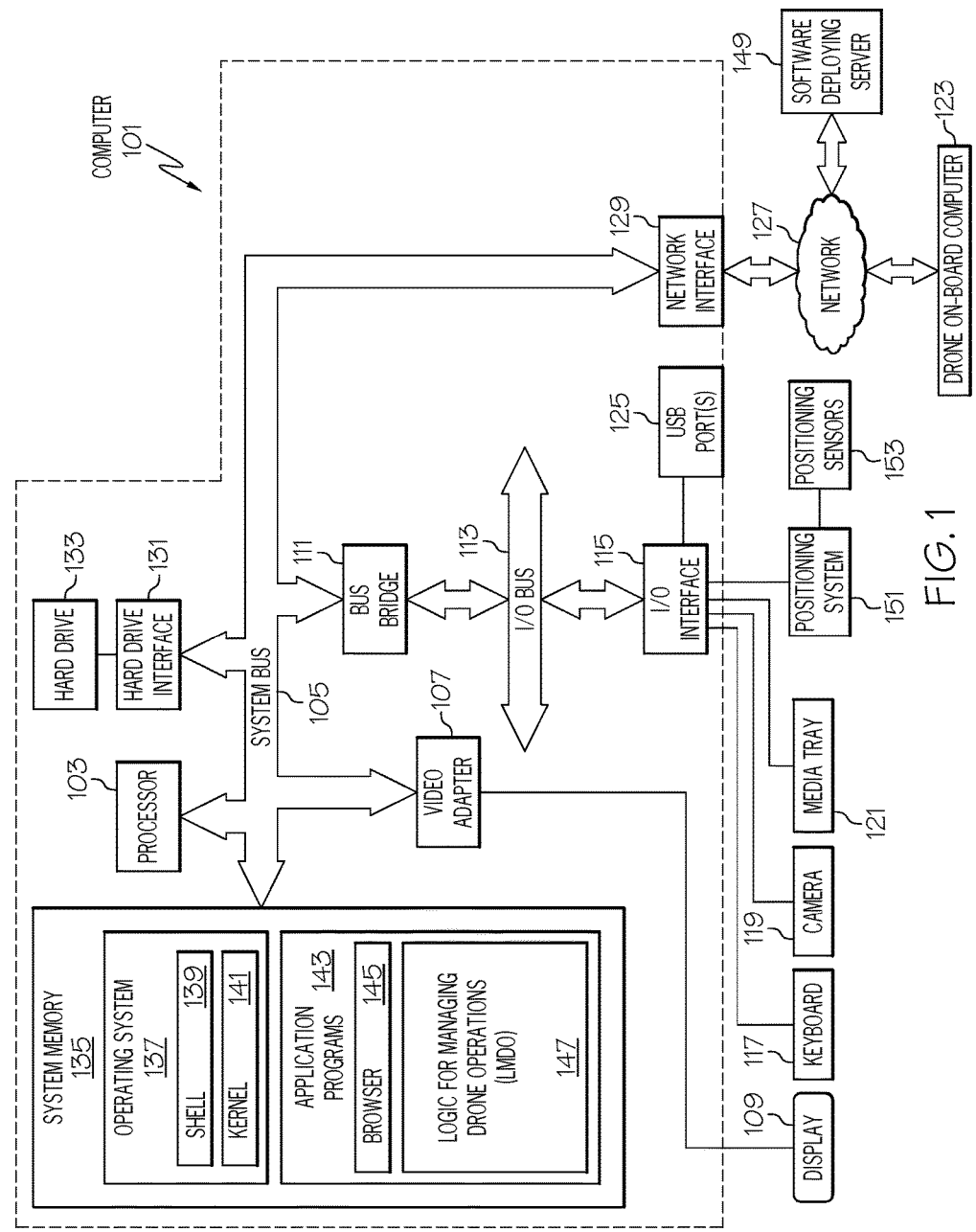
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by drone on-board computer 123 and/or positioning system 151 shown in FIG. 1, and/or drone on-board computer 223 shown in FIG. 2, and/or drone on-board computer 323 shown in FIG. 3.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a camera 119 (i.e., a digital camera capable of capturing still and moving images), a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

Also coupled to I/O interface 115 is a positioning system 151, which determines a position of computer 101 and/or other devices using positioning sensors 153. Positioning sensors 153 may be any type of sensors that are able to determine a position of a device, including computer 101, an aerial drone 200 shown in FIG. 2, etc. Positioning sensors 153 may utilize, without limitation, satellite based positioning devices (e.g., global positioning system—GPS based devices), accelerometers (to measure change in movement), barometers (to measure changes in altitude), etc.

As depicted, computer 101 is able to communicate with a software deploying server 149 and/or other devices/systems (e.g., drone on-board computer 123) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory also include Logic for Managing Drone Operations (LMDO) 147. LMDO 147 includes code for implementing the processes described below, including those described in FIGS. 2-5.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
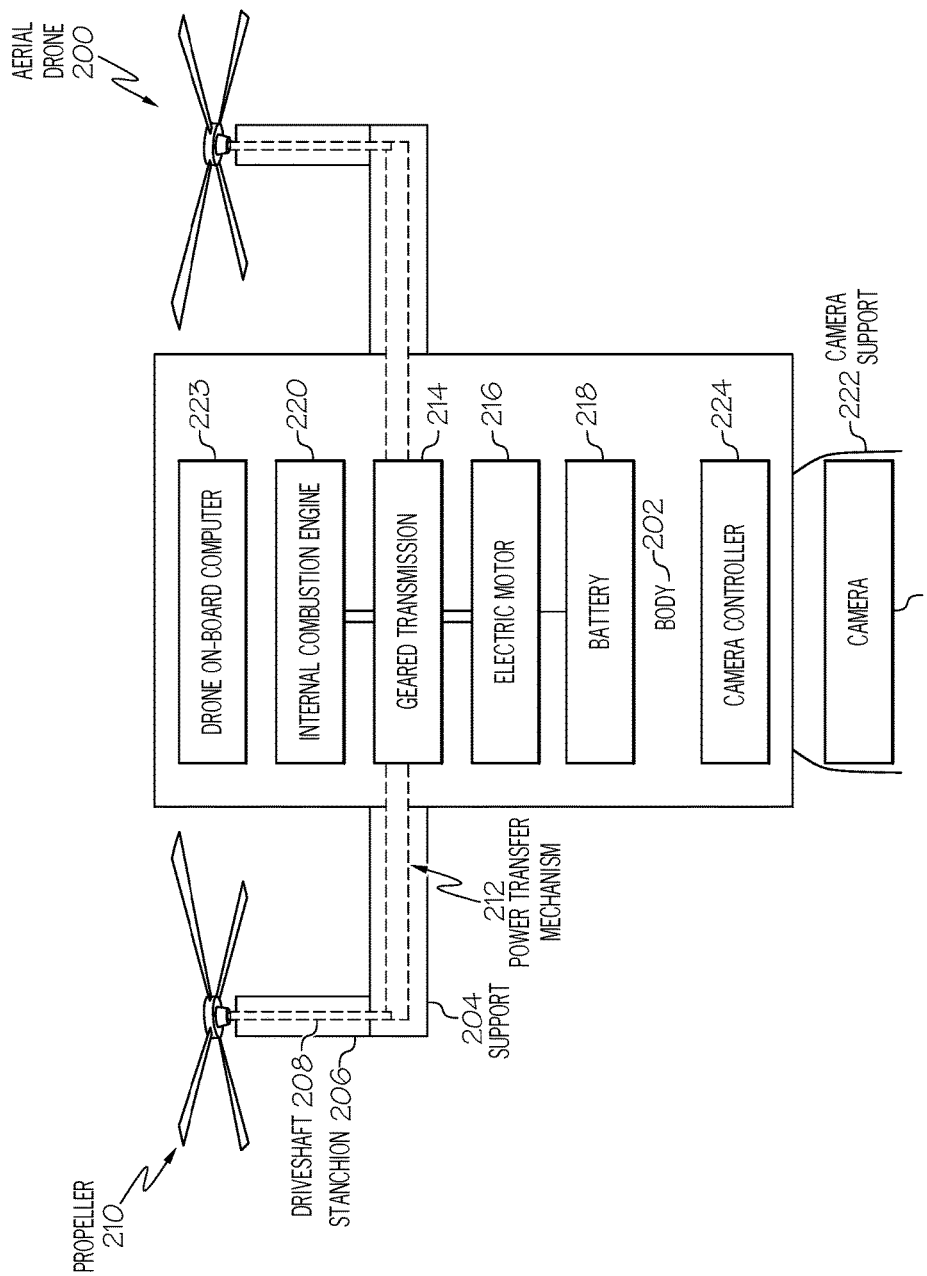
FIG. 2 depicts additional detail of an exemplary aerial drone in accordance with one or more embodiments of the present invention.

FIG. 2 illustrates an exemplary aerial drone 200 in accordance with one or more embodiments of the present invention. The terms "aerial drone", "drone", and "unmanned aerial vehicle" ("UAV") are used interchangeably herein to identify and describe an airborne vehicle that is capable of pilot-less flight and monitoring a user that controls the drone using physical gestures.

As shown in FIG. 2, aerial drone 200 includes a body 202, which is attached to supports such as support 204. Supports such as support 204 support stanchions such as stanchion 206. Such stanchions provide a housing for a driveshaft within each of the stanchions, such as the depicted driveshaft 208 within stanchion 206. These driveshafts are connected to propellers. For example, driveshaft 208 within stanchion 206 is connected to propeller 210.

A power transfer mechanism 212 (e.g., a chain, a primary driveshaft, etc.) transfers power from a geared transmission 214 to the driveshafts within the stanchions (e.g., from geared transmission 214 to the driveshaft 208 inside stanchion 206), such that propeller 210 is turned, thus providing lift and steering to the aerial drone 200. Geared transmission 214 preferably contains a plurality of gears, such that a gear ratio inside geared transmission 214 can be selectively changed.

Power to the geared transmission 214 is selectively provided by an electric motor 216 (which is supplied with electrical power by a battery 218) or an internal combustion engine 220, which burns fuel from a fuel tank (not shown). In one or more embodiments of the present invention, the internal combustion engine 220 has greater power than the electric motor 216, since internal combustion engines are able to produce greater torque/power and have a greater range (can fly farther) than electric motors of the same size/weight.

Affixed to the bottom of body 202 is a camera support 222 that holds a camera 226. A camera controller 224 is able to aim, focus, etc. camera 226 under the control of the drone on-board computer 223.

Figure 3:
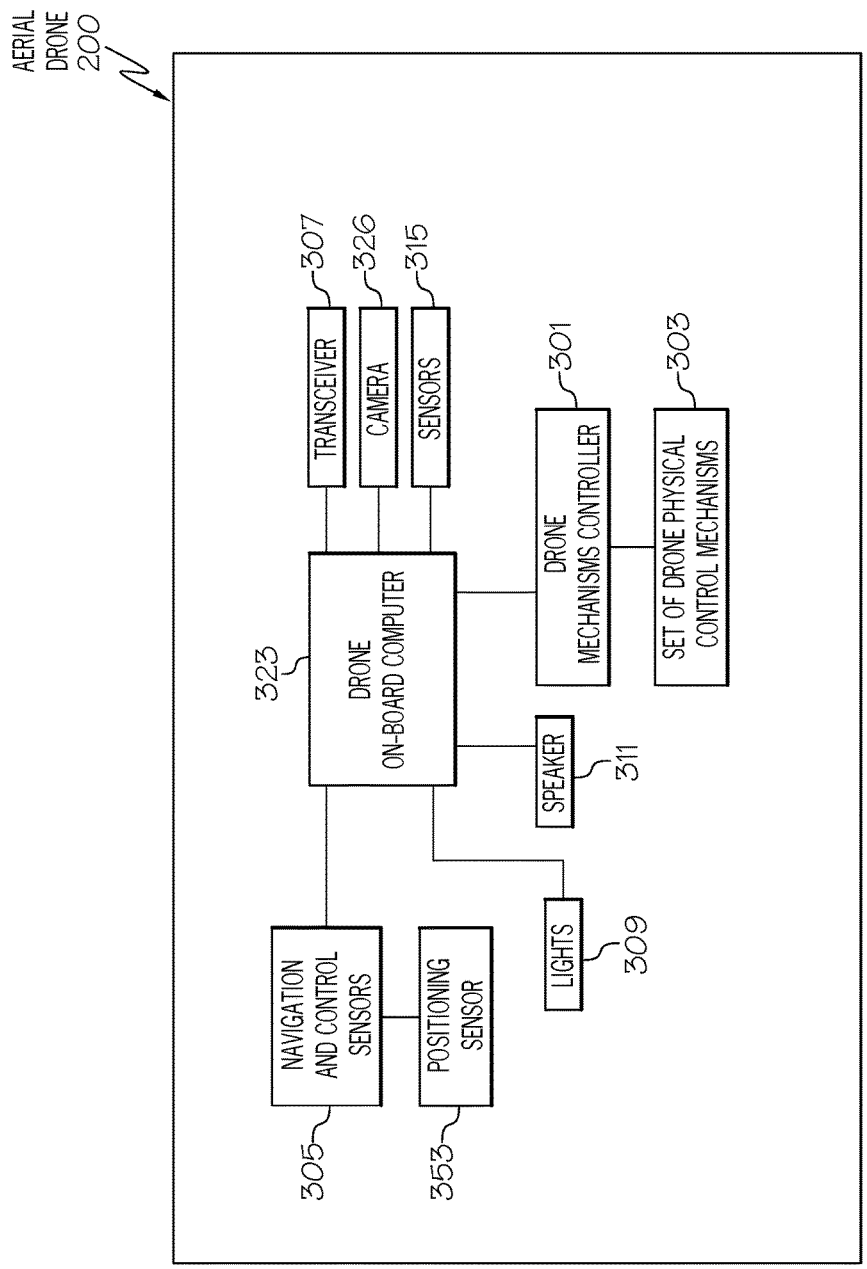
FIG. 3 illustrates control hardware and other hardware features of an exemplary aerial drone in accordance with one or more embodiments of the present invention.

With reference now to FIG. 3, exemplary control hardware within the aerial drone 200 presented in FIG. 2 is depicted.

A drone on-board computer 323 (analogous to drone on-board computer 223 shown in FIG. 2) controls a drone mechanism controller 301, which is a computing device that controls a set of drone physical control mechanisms 303. The set of drone physical control mechanisms 303 includes, but is not limited to, throttles for internal combustion engine 220 and/or electric motor 216, selectors for selecting gear ratios within the geared transmission 214, controls for adjusting the pitch, roll, and angle of attack of propellers such as propeller 210 and other controls used to control the operation and movement of the aerial drone 200 depicted in FIG. 2.

Whether in autonomous mode or remotely-piloted mode (based on gestures made by the user), the drone on-board computer 323 controls the operation of aerial drone 200. This control includes the use of outputs from navigation and control sensors 305 to control the aerial drone 200. Navigation and control sensors 305 include hardware sensors that (1) determine the location of the aerial drone 200; (2) sense other aerial drones and/or obstacles and/or physical structures around aerial drone 200; (3) measure the speed and direction of the aerial drone 200; and (4) provide any other inputs needed to safely control the movement of the aerial drone 200.

With respect to the feature of (1) determining the location of the aerial drone 200, this is achieved in one or more embodiments of the present invention through the use of a positioning system such as positioning system 151 (shown in FIG. 1), which may be part of the drone on-board computer 323, combined with positioning sensor 353. Positioning system 151 may use a global positioning system (GPS), which uses space-based satellites that provide positioning signals that are triangulated by a GPS receiver to determine a 3-D geophysical position of the aerial drone 200. Positioning system 151 may also use, either alone or in conjunction with a GPS system, physical movement sensors such as accelerometers (which measure changes in direction and/or speed by an aerial drone in any direction in any of three dimensions), speedometers (which measure the instantaneous speed of an aerial drone), air-flow meters (which measure the flow of air around an aerial drone), barometers (which measure altitude changes by the aerial drone), etc. Such physical movement sensors may incorporate the use of semiconductor strain gauges, electromechanical gauges that take readings from drivetrain rotations, barometric sensors, etc.

With respect to the feature of (2) sensing other aerial drones and/or obstacles and/or physical structures around aerial drone 200, the drone on-board computer 323 may utilize radar or other electromagnetic energy that is emitted from an electromagnetic radiation transmitter (e.g., transceiver 307 shown in FIG. 3), bounced off a physical structure (e.g., a building, bridge, or another aerial drone), and then received by an electromagnetic radiation receiver (e.g., transceiver 307). By measuring the time it takes to receive back the emitted electromagnetic radiation, and/or evaluating a Doppler shift (i.e., a change in frequency to the electromagnetic radiation that is caused by the relative movement of the aerial drone 200 to objects being interrogated by the electromagnetic radiation) in the received electromagnetic radiation from when it was transmitted, the presence and location of other physical objects can be ascertained by the drone on-board computer 323.

With respect to the feature of (3) measuring the speed and direction of the aerial drone 200, this is accomplished in one or more embodiments of the present invention by taking readings from an on-board airspeed indicator (not depicted) on the aerial drone 200 and/or detecting movements to the control mechanisms (depicted in FIG. 2) on the aerial drone 200 and/or the positioning system 151 discussed above.

With respect to the feature of (4) providing any other inputs needed to safely control the movement of the aerial drone 200, such inputs include, but are not limited to, control signals to fly the aerial drone 200 to a safely hidden position, to direct the aerial drone 200 to make an emergency landing, etc.

Also on aerial drone 200 in one or more embodiments of the present invention is a camera 326, which is capable of sending still or moving visible light digital photographic images (and/or infrared light digital photographic images) to the drone on-board computer 323. These images can be used to determine the location of the aerial drone 200 (e.g., by matching to known landmarks), to sense other drones/obstacles, and/or to determine speed (by tracking changes to images passing by), as well as to receive visual images of physical control gestures made by the drone user as described herein.

Also on aerial drone 200 in one or more embodiments of the present invention are sensors 315. Examples of sensors 315 include, but are not limited to, air pressure gauges, microphones, barometers, chemical sensors, vibration sensors, etc., which detect a real-time operational condition of aerial drone 200 and/or an environment around aerial drone 200. Another example of a sensor from sensors 315 is a light sensor, which is able to detect light from other drones, street lights, home lights, etc., in order to ascertain the environment in which the aerial drone 200 is operating.

Also on aerial drone 200 in one or more embodiments of the present invention are lights 309. Lights 309 are activated by drone on-board computer 323 to provide visual warnings, alerts, etc. as described herein.

Also on aerial drone 200 in one or more embodiments of the present invention is a speaker 311. Speaker 311 is used by drone on-board computer 323 to provide aural warnings, alerts, etc. as described herein.

Figure 4:
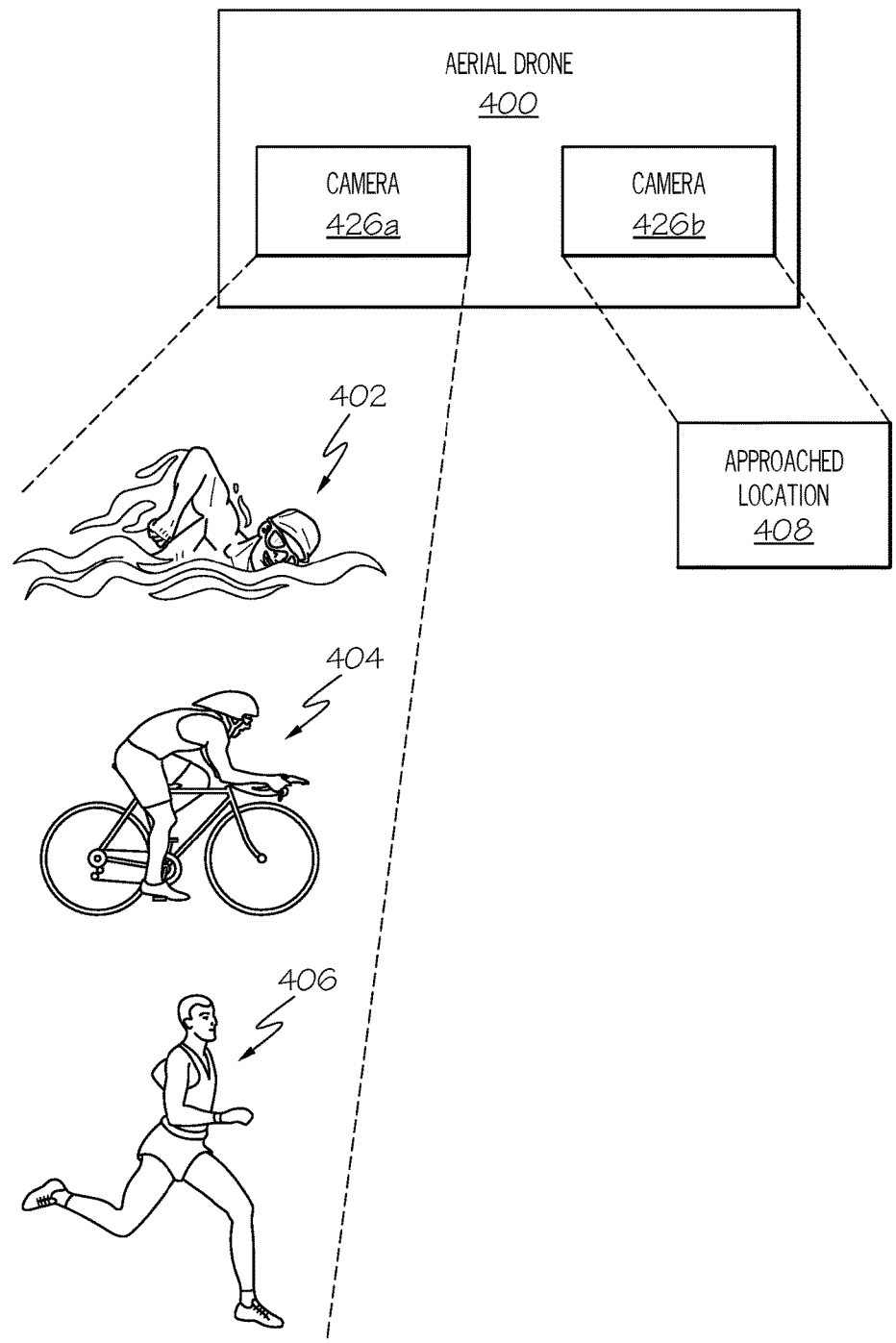
FIG. 4 depicts an aerial drone being utilized in accordance with one or more embodiments of the present invention.

With reference now to FIG. 4, an aerial drone 400 is depicted being utilized in accordance with one or more embodiments of the present invention. As described in FIG. 4, aerial drone 400 can be placed into various modes depending on 1) the activity in which the user is engaged and/or 2) the location of the user.

For example, consider aerial drone 400 (analogous to aerial drone 200 shown in FIG. 2). In the example shown in FIG. 4, aerial drone 400 is watching a user who is participating in a triathlon. Thus, at different times during the triathlon race the same user being watched by the aerial drone 400 is a swimmer 402, a cyclist 404, and a runner 406. A camera 426a (analogous to camera 226 shown in FIG. 2) captures images of the user during all three phases of the triathlon race.

Assume now that initially the user is making movements that are indicative of swimming (e.g., moving his/her arms in a certain motion, etc.) and/or in an environment (e.g., water) in which swimming occurs. In an embodiment of the present invention, the aerial drone 400 compares motions of the user to a database of video files of (known) swimmers. That is, the current video image is digitized and markers are placed on certain points on the digitized image of the swimmer. If the motions (markers movement) match between the current video and those found in the database of video files of swimmers, then a conclusion is drawn that the user is in fact swimming. Thus, the camera 426a captures images of the user making such movements in a water environment, and concludes that the user is now a swimmer 402. Upon making this determination, the aerial drone 400 switches to "Mode 1", which is tailored to monitoring swimmers.

For example, while in "Mode 1", the aerial drone 400 will execute software in the drone on-board computer 223 (shown in FIG. 2) to watch for signs of swimmer 402 drowning, sharks in the water in which swimmer 402 is swimming, etc. Problems related to the swimmer 402 are captured by camera 426a, while problems/hazards related to where the swimmer 402 is headed (approached location 408) are captured by camera 426b. In one embodiment, camera 426a and camera 426b are a same camera. If the drone on-board computer 223 detects such aquatic problems (either at the current location of the swimmer 402 or at the approached location 408), then swimmer 402 is alerted by the aerial drone 400 through the use of flashing lights from the aerial drone 400 (e.g., lights 309 shown in FIG. 3) or a message being broadcast from a loudspeaker on the aerial drone 400 (e.g., speaker 311 shown in FIG. 3) or an electronic message from the aerial drone 400 to an electronic receiver device (not shown) worn by the swimmer 402 (e.g., using transceiver 307 shown in FIG. 3). It is to be understood that such a warning can be broadcast not only to the swimmer 402 being monitored by the aerial drone 400, but can also be broadcast to all other swimmers (e.g., other participants in the triathlon) in the vicinity of swimmer 402.

Subsequently in the triathlon race, the same user transitions from being a swimmer 402 to becoming the cyclist 404. The camera 426a captures an image of the bicycle upon which the user is riding, the speed at which the user is moving (e.g., occasionally exceeding 20 miles per hour), the roadway upon which the user is moving, etc. to determine that the user has in fact transitioned from being a swimmer 402 to being a cyclist 404. This causes the aerial drone 400 to transition into "Mode 2", which is tailored to monitoring cyclists.

For example, while in "Mode 2", the aerial drone 400 will execute software in the drone on-board computer 223 (shown in FIG. 2) to watch for an indication that the cyclist 404 has fallen (thus causing the aerial drone 400 to send a request for help from the cyclist's support team, medical personnel, etc.), etc. Furthermore, camera 426b (also analogous to camera 226 shown in FIG. 2) monitors an approached location 408 (e.g., upcoming portions of the roadway on which the cyclist 404 is cycling). If camera 426b detects a hazard (e.g., road hazard) at the approached location 408 (which currently may not be visible to cyclist 404), then cyclist 404 is alerted by the aerial drone 400 using lights (e.g., lights 309 shown in FIG. 3) or a loudspeaker (e.g., speaker 311 shown in FIG. 3) or an electronic message sent from the aerial drone 400 to a device worn by the runner 404 (e.g., using transceiver 307 shown in FIG. 3).

Subsequently in the triathlon race, the same user transitions from being a cyclist 404 to becoming a runner 406. The camera 426a captures an image of the user to detect typical running motions by the user, the speed at which the user is moving (e.g., between 4-12 miles per hour), the roadway upon which the user is moving, etc. to determine that the user has in fact transitioned from being a cyclist 404 to being a runner 406. This causes the aerial drone 400 to transition into "Mode 3", which is tailored to monitoring runners.

For example, while in "Mode 3", the aerial drone 400 will execute software in the drone on-board computer 223 (shown in FIG. 2) to watch for an indication that the runner 406 has fallen (thus causing the aerial drone 400 to send a request for help from the runner's support team, medical personnel, etc.), etc. Furthermore, camera 426b (also analogous to camera 226 shown in FIG. 2) monitors an approached location 408 (e.g., upcoming portions of the roadway on which the runner 406 is running). If camera 426b detects a hazard (e.g., road hazard) at the approached location 408 (which currently may not be visible to runner 406), then runner 406 is alerted by the aerial drone 400 using lights (e.g., lights 309 shown in FIG. 3) or a loudspeaker (e.g., speaker 311 shown in FIG. 3) or an electronic message from the aerial drone 400 to a device worn by the runner 406 (e.g., using transceiver 307 shown in FIG. 3).

Note that the actions being performed by the user to indicate whether he is swimming, cycling, or running are not the gestural movements discussed above to issue control commands to the aerial drone 400. Rather, the acts/actions being performed are used to identify the activity of the user, in order to determine which in mode of operation the aerial drone 400 should be functioning. That is, the present system recognizes two types of physical movement by the user. The first type of movement by the user (e.g., a hand signal) is a drone-recognized gesture that controls the movement of the drone. The second type of movement by the user (e.g., legs moving up and down on a bicycle) is a drone-recognized movement that is used to determine the type of activity in which the user is presently engaged, in order to place the drone in a particular mode (as described above).

Figure 5:
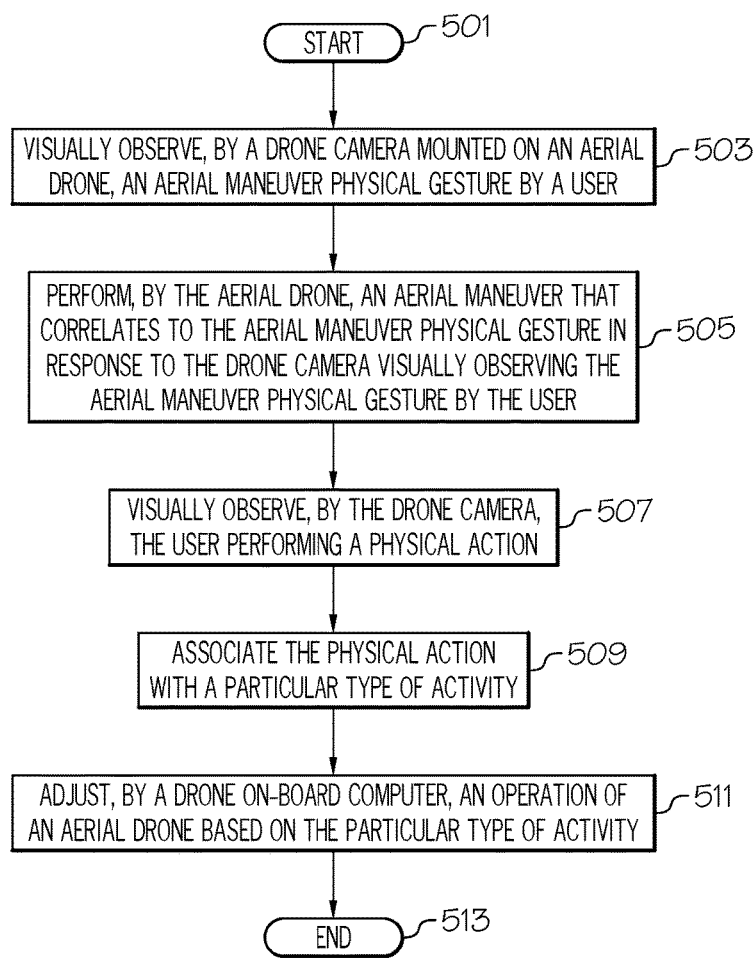
FIG. 5 is a high-level flow chart of one or more steps performed by one or more computing and/or other hardware devices to control movement and adjust operations of an aerial drone in accordance with one or more embodiments of the present invention.

With reference now to FIG. 5, a high-level flow chart of one or more steps performed by one or more computing and/or other hardware devices to control movement and adjust operations of an aerial drone in accordance with one or more embodiments of the present invention is presented.

After initiator block 501, a drone camera (e.g., camera 426 shown in FIG. 4) mounted on an aerial drone (e.g., aerial drone 400 shown in FIG. 4) observes (i.e., captures an image of) an aerial maneuver physical gesture by a user, as described in block 503. That is, the drone camera captures an image of the user making a physical gesture with his hands, arms, fingers, etc. that are intended by the user to convey a control command to the aerial drone.

As described in block 505, the aerial drone then performs an aerial maneuver that correlates to the aerial maneuver physical gesture in response to the drone camera observing the aerial maneuver physical gesture by the user. For example, the drone on-board computer 323 shown in FIG. 3 will receive the image captured by the camera 326, will compare that captured (still or moving) image to known images that correspond to certain control commands, and will execute the control command that most closely matches the currently-captured image of the user's physical gesture.

As described herein, the present invention not only controls movement of the aerial drone according to the physical gestures (e.g., by the hand, arm, etc.) of the user, but also adjusts the operational mode of the drone based on the activity being engaged in by the user and/or the current environment of the user.

Thus as indicated by block 507, the drone camera also observes the user performing a physical action (e.g., moving his arms in a certain manner that is not recognized as a physical gesture that represents a certain control command, but rather is recognized as a certain type of activity). Thus, as described in block 509, one or more processors (e.g., within the drone on-board computer 323) associate the physical action with a particular type of activity. For example and as described in FIG. 4, if the user is moving his arms in a certain pattern while in water, then the system determines that he/she is swimming.

As described in block 511, the drone on-board computer then adjusts an operation of an aerial drone based on the particular type of activity, as described in exemplary manner with regard to FIG. 4.

The flow chart ends at terminator block 513.

While the present invention is described for explanatory purposes in the context of a triathlon, it is to be understood that other types of activities can be observed and classified by the aerial drone 400 presented herein. For example, the aerial drone 400 may detect and monitor the activities of paddle boarders, surfers, sail boaters, motor boaters, water skiers, snow skiers, etc., and adjust the mode of operation of the aerial drone 400 accordingly.

For example, if the aerial drone 400 detects a snow skier falling down and not getting up within a certain amount of time (e.g., one minute), then the aerial drone 400 will switch from a first mode (e.g., watching for ski slope hazards downhill from the snow skier) to a second mode (e.g., alerting the ski patrol to send medical help and/or other assistance to the skier).

In an embodiment of the present invention, one or more processors (e.g., within drone on-board computer 323 or on another computer (e.g., computer 101 shown in FIG. 1) analyze a video feed from the drone camera. This analyzing identifies a type of physical environment occupied by the user (e.g., water, a roadway, a desert, etc.). The processor(s) then determine the particular type of activity based on the type of physical environment occupied by the user. For example, if the user is moving his arms in a windmill motion while in water, then he is engaged in the activity of swimming. If the user is moving his arms in a windmill motion while standing on land, then he is likely engaged in calisthenics exercising.

In an embodiment of the present invention in which the user is on a paddleboard or similar personal water craft (canoe, kayak, jet-propelled personal watercraft, etc.), the aerial drone 400 will initially be in a first mode (e.g., watching for water hazards in front of the user). If the user falls off or out of the personal water craft for longer than a predefined length of time (e.g., one minute), then the aerial drone 400 will transition into a second mode (e.g., alerting first responders to provide assistance to the user).

In an embodiment of the present invention, the drone camera detects a predefined anomalous physical action by the user (e.g., the user starts flailing in the water). That is, the on-board computer compares mapped points captured in a video of the user to stored video mapped points from a database to determine that the user is in trouble (flailing in the water). In response to detecting the predefined anomalous physical action by the user, a drone on-board computer adjusts a type of monitoring performed by the drone camera. For example, the drone on-board computer may switch from merely watching the swimmer to directing emergency responders to the swimmer's location, issuing warnings, moving the drone to a safe/concealed area, etc.

In an embodiment of the present invention, the drone camera detects a predefined anomalous physical action by the user (e.g., the swimmer flailing in the water). In response to detecting the predefined anomalous physical action by the user, a drone on-board computer transmits a video feed from the drone camera to an emergency responder (e.g., a video feed of the swimmer flailing in the water). Similarly, the video feed and/or alerts described herein can be transmitted to officials of a race (e.g., in the embodiment in which the aerial drone 400 is monitoring participants to a triathlon).

In an embodiment of the present invention, the drone camera detects a physical hazard at a location towards which the user is approaching (e.g., an upcoming portion of roadway upon which a cyclist is peddling, an area of water towards which a swimmer is swimming, etc.). In response to detecting the physical hazard at the location towards which the user is approaching, a transmitter on the aerial drone transmits an alert to the user. The alert, which may be visual, aural, or electronic, warns the user of the physical hazard at the location towards which the user is approaching.

In an embodiment of the present invention, the aerial drone is part of a drone swarm of multiple drones. As described herein, drone cameras mounted on the drone swarm detect a first physical gesture of the user (e.g., the user holding up his/her thumb and first finger). This first physical gesture identifies (i.e., is interpreted by the drone on-board computer 323) a drone subset of the drone swarm (e.g., drone #1 and drone #2). The drone cameras mounted on the drone subset (i.e., drone #1 and drone #2) then detect a second physical gesture of the user (e.g., an opening of the user's fist). This second physical gesture is specific for an action to be performed by the drone subset (e.g., to land immediately). The drone subset (i.e., drone #1 and drone #2) then perform the action in response to said detecting the second physical gesture of the user. That is, only drone #1 and drone #2 will immediately land, while other drones in the drone swarm (e.g., drone #3, drone #4, and drone #5) will ignore the hand signal of opening the user's first (since they were not "selected" by the user holding up his/her thumb and first finger), and will continue to operate as before.

In an embodiment of the present invention, the drone camera on the aerial drone detects an authorization physical gesture by the user. This authorization physical gesture (e.g., a certain sequence of hand and arm movements) is a predefined physical gesture that authorizes the user to take control of the aerial drone. In response to the drone camera on the aerial drone detecting (and the drone on-board computer 323 interpreting) the authorization physical gesture by the user, a drone on-board computer (upon receiving and analyzing the captured image by the drone camera of the user making the authorization physical gesture) on the aerial drone transfers/authorizes control of the aerial drone to the user.

In an embodiment of the present invention, one or more sensors (e.g., camera 326, sensors 315, etc.) identify/detect an aerial obstacle (e.g., a building) to the aerial drone. The drone on-board computer receives an output from these sensors, and adjusts a flight path of the aerial drone in order to avoid the aerial obstacle.

Thus, disclosed herein is a system by which a drone (i.e., a flying aerial drone) images a controller (e.g., a human operator), and based on onboard image analytics, performs gesture sensing of the drone user. Based on a determination of the user's gesture, the drone performs the aerial maneuver indicated. For example, a drone user points at the drone and moves it from one side of a room to another by "dragging" the drone to the new location with the movement of his or her hand and arm. Further features disclosed herein include adjusting the operations of the drone based on what type of activity in which the drone user is involved; gesture authorization; control of drone swarms; and drone sensing of passive behaviors and gestures/gaits.

In one or more embodiments of the present invention, not only are hand/arm movements used to control the drone, but facial movements may also be utilized. For example, a facial expression of "shock" or "fear" may be detected/determined by the drone using an on-board camera and facial interpretation software running on an on-board computer. This allows the drone to realize/determine that the drone user has lost control of the drone, is in personal peril, etc. On-board processors in the drone will capture such a facial expression, map known reference points on the captured image of the user's face, compare these captured reference points to a database of facial points known to be associated with certain human emotions, and will then conclude that the drone user is afraid, in pain, etc. Based on this conclusion, the operation of the aerial drone will be turned over to an autonomous controller, which will alter the course of the drone (change directions), land the drone, call for emergency medical help for the user, etc.

In one or more embodiments of the present invention, the facial recognition software is able to "read lips". That is, by mapping reference points on the drone user's face and throat (lips, cheeks, neck), tracking movement of these reference points as the drone user is speaking, and then matching these moving reference points to a database of known moving facial reference points related to certain words, the system is able to determine what the drone user is saying. If the user is speaking commands for the drone, then such commands will be executed by an on-board controller in the drone. If the user is speaking words that are not in a database of commands for the drone, then the drone will perform a contextual analysis of the words being spoken by the user to adjust the operation of the drone. For example, if the user is saying "I'm hurt", then the drone will switch operation from merely photographing the user to sending a message and/or video feed to an emergency responder, requesting help for the user.

In one or more embodiments of the present invention, the facial recognition software is able to read sign language (e.g., American Sign Language). That is, by mapping reference points on the drone user's hands and fingers, tracking movement of these reference points as the drone user is "speaking" in sign language, and then matching these moving reference points to a database of known signs, the system is able to determine what the drone user is signing. If the user is signing commands for the drone, then such commands will be executed by an on-board controller in the drone. If the user is signing words that are not in a database of commands for the drone, then the drone will perform a contextual analysis of the words being signed by the user to adjust the operation of the drone as described herein.

The commands being sent to the drone may be any aerial maneuver, including but not limited to flying in a particular direction; landing; starting to fly (taking off); aerobatics (loops, spins, etc.); deploying certain sensing capabilities (e.g., activating certain sensors on the drone); deploying certain noise abatement capabilities (e.g., switching from a combustion engine to a quiet electric engine); deploying certain safely capabilities (e.g., deploying protective guards around sharp rotor blades); flying to a concealed position for a certain period of time; etc. All such commands are detected and executed by a drone camera capturing an image of the user making a physical gesture, such that a drone on-board controller/computer combination interprets the captured image of the user making the physical gesture in order to direct drone control mechanisms to maneuver the drone accordingly.

Thus, in one example the drone user points at the drone and moves it from one side of a room to another by "dragging" the drone to the new location with the movement of his or her hand and arm.

In another example, the user changing his/her hand from an open hand to a closed first signals a drone to either land or take off.

In another example, a flat palm (fingers parallel to the ground) signals a drone to stop moving forward and hover.

In another example, the system will deploy certain sensing capabilities (e.g., activating certain sensors on the drone) in response to visually detected gestures by the user. For example, as shown in FIG. 3 an aerial drone 200 may have an on-board camera 326 and/or sensors 315, each of which have certain sensing capabilities. The drone on-board computer 323 shown in FIG. 3 can then activate the camera 326 and aim it at a particular position, such as where the user is pointing with his/her hand. Similarly, if the user makes a specific hand gesture (e.g., lifting up his/her first and then opening it up, thus implying a sensor 315 be turned on/opened up), sensors 315 may be activated and sensor readings taken therefrom in response to this type of hand gesture. Examples of sensors 315 include, but are not limited to, air pressure gauges, microphones, barometers, chemical sensors, vibration sensors, etc., which detect a real-time operational condition of aerial drone 200 and/or an environment around aerial drone 200.

In another example, the system will deploy certain noise abatement capabilities (e.g., switching from a combustion engine to a quiet electric engine) in response to a visually detected gesture by the user. For example, assume that the aerial drone 200 shown in FIG. 2 has two sources of power: an internal combustion engine 220 and an electric motor 216. If the drone on-board computer 323 receives an image of the user showing the user holding a finger up to his/her lips (indicating the desire for the aerial drone 220 to be quiet), then the drone on-board computer 323 will shut off the loud internal combustion engine 220 and turn on the relatively quiet electric motor 216.

In another example, the system will cause the aerial drone to fly to a concealed position for a certain period of time in response to a visually detected gesture by the user. For example, assume that the camera 326 sends an image of the user waving his/her hands downwards, which is interpreted by the drone on-board computer 323 as a direction to the aerial drone 200 to fly to a location where it is concealed (e.g., behind a building, behind a tree, etc.) from the user. The drone on-board computer 323 will identify any object tall/large enough to hide behind, and will then autonomously fly the aerial drone 200 behind the identified object.

Drone Swarm Control. In an embodiment of the present invention, the aforementioned gestures are used to control more than one drone, e.g. a swarm of drones. As described herein, this control is not merely having multiple drones follow a same gesture, but rather causes a first subset of the swarm to follow a certain gesture (to perform a first aerial maneuver) while a second subset of the swarm follows another gesture (to perform a second aerial maneuver). For example, assume that there are five drones that are being controlled by a single user. Assume now that the user holds up his thumb and first finger. The camera 326 sends an image of this hand gesture to the drone on-board computer 323 shown in FIG. 3, thus instructing the drone on-board computer 323 to follow the next hand gesture command from the user. That is, when the user extends his/her thumb, he/she is indicating that the next command is for aerial drone 200 (one of a swarm of five drones). Likewise, another aerial drone (not depicted) will know that the next command is directed to that other aerial drone. If the user had held up the middle, ring, or small finger, then aerial drone 200, which is identified by the thumb gesture, will ignore subsequent hand gesture controls made by the user.

In an embodiment of the present invention, the user's hand gestures are able to control the movement of drones in a drone swarm relative to one another. For example, assume that drones in the drone swarm visually detect the user opening up his/her fingers (i.e., splaying his/her fingers apart). This movement of the user's fingers will direct the drones in the drone swarm to spread farther apart relative to one another (i.e., the drone swarm will expand in space). Similarly, if the drones in the drone swarm visually detect the user bringing his/her fingers together and/or forming a fist, then the drones in the drone swarm will cluster closer together (i.e., the drone swarm will compress in spatial, but not drone number, size).

In an embodiment of the present invention, the gestures made by the drone user include a gestural password that authorizes that person to control the drone with additional gestures. For example, a "secret handshake" gesture (e.g., a specific pattern of hand/finger/arm movements) is captured and interpreted by the drone on-board computer 323 shown in FIG. 3 as being an authentication/authorization movement needed to take control of the aerial drone 200.

In an embodiment of the present invention, the drone performs facial recognition on the drone user, in order to confirm the identity of the drone user, and to thus authenticate/authorize that user to control the drone. That is, if facial recognition software does not identify and recognize the user as an authorized controller/user of the aerial drone 200 shown in FIG. 3, then the drone on-board computer 323 will not respond to gestural commands made by that user.

Multistage Confirmation: In some cases, the drone will not be "certain" it properly recognized a gesture (control, authorization, etc.). Thus in an embodiment of the present invention, the drone will take no action, or a partial action, wait for confirmation, and then if confirmation is given by the drone operator, it will perform/continue an action.

In an embodiment of the present invention, exoskeletons or related devices worn on the hands aid/support/augment visual recognition performed by a drone. In this embodiment, piloting commands and actions are performed using the exoskeleton worn on a hand of the user. This exoskeleton may include a motion sensor module, with gyro-sensor and g-sensor for controlling roll, yaw and pitch of flying object under relative or absolute coordinate system. Radio Frequency (RF) and Infra Red (IR) capability is included for wireless communication.

In an embodiment of the present invention, an integrated camera system on the drone images the surrounding environment where more than one (human) controller is positioned, and identifies a user hand gesture as an interactive control element location command, such that the location of the human controller remains fixed with respect to an object in the surrounding environment.

Authorization: In one or more embodiments of the present invention, only an authorized user can make drone-controlling gestures. In various embodiments of the present invention, this authorization is carried out by the drone for a user, or by a device that is connected to the drone. The authorization may include a username and password or other authentication measures. A specific username may be constrained to a specific set of operations it may carry out. A user that is an administrator of the drone may have complete access to the gestures understood and acted upon by the drone.

Smartphone involvement: In one or more embodiments of the present invention, the user's drone-controlling gestures are detected by a smartphone or other such device that has been connected to the drone using Wi-Fi, near field communication (NFC) transmissions, etc. In these embodiments, the user can make gestures on the device, which has an app that detects and analyzes the gesture, and sends corresponding commands to the drone. The app is trained by the user and is configured to a list of gestures and the appropriate/corresponding action that the drone should take. There may be multiple drones managed by the app on the device. Per drone, there is a set of such gestures that have been added to the app by a user. The smartphone may perform analytics calculations or communicate with a cloud that performs such calculations, or the drone may perform analytics calculations (such as gesture recognition analytics).

Sensing of passive behaviors and gestures/gaits: In one or more embodiments of the present invention, the system senses passive behaviors and gestures of the operator in order to switch the flight parameters of a drone. For example, an operator who is walking may cause a drone to operate in "Mode 1" flight plan. As soon as the operator begins to run, the invention senses this change in behavior and whole body gesturing in order to assume a "Mode 2" flight plan. Finally, when an operator is in a reclined posture facing forward, the drone assumes a "Mode 3" flight plan. This automatic mapping between bodily gestures (even whole body) and drone operations and flight plans are therefore presented by the present invention. Further examples of this embodiment are shown and discussed in FIG. 4.

The present invention may be implemented in one or more embodiments using cloud computer. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
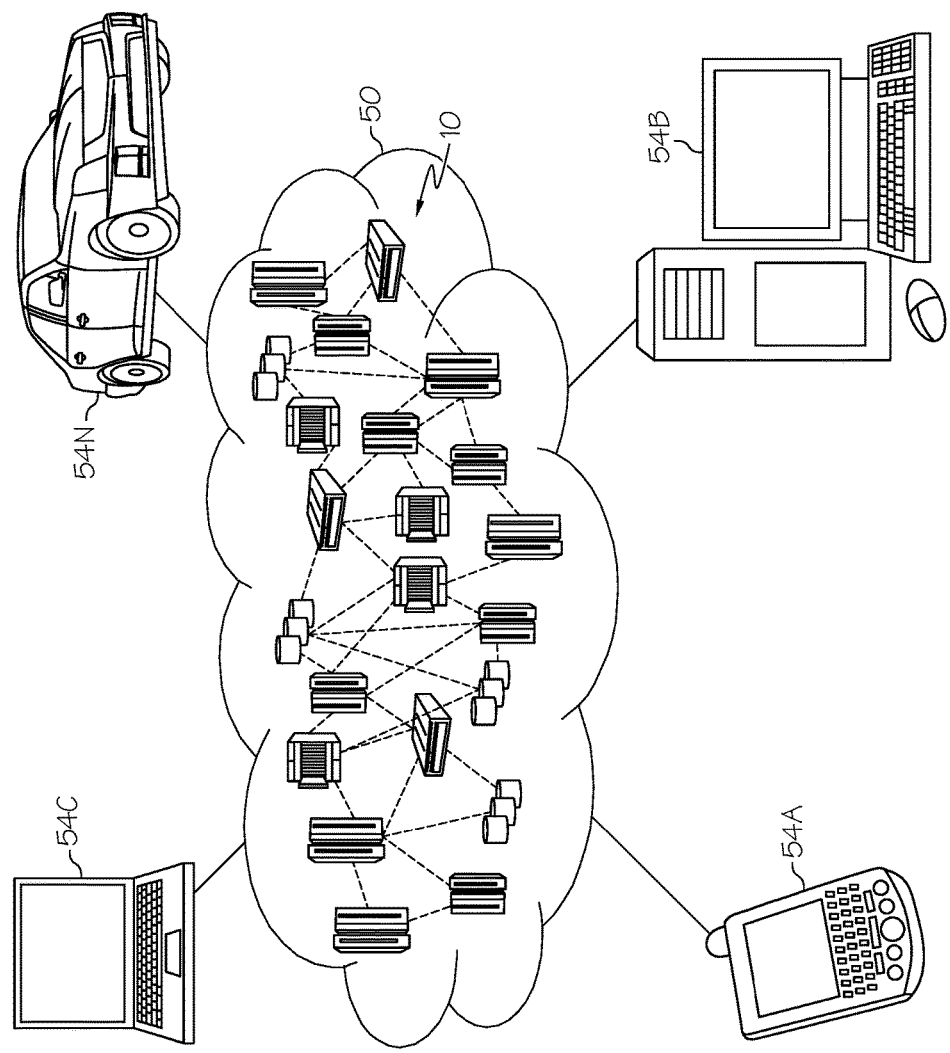
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and drone control processing 96.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method of controlling movement and adjusting operations of an aerial drone, the method comprising:
    observing, by a drone camera mounted on an aerial drone, an aerial maneuver physical gesture by a user;
    performing, by the aerial drone, an aerial maneuver that correlates to the aerial maneuver physical gesture in response to the drone camera observing the aerial maneuver physical gesture by the user;
    observing, by the drone camera, the user performing a physical action;
    associating, by one or more processors, the physical action with a particular type of recreational activity;
    adjusting, by a drone on-board computer, operations of the aerial drone based on the particular type of recreational activity;
    placing, by the drone on-board computer, the aerial drone in manual mode, wherein the aerial drone is manually controlled by the user when in the manual mode;
    detecting, by the drone camera, a facial expression of the user;
    comparing, by the one or more processors, the facial expression of the user to a database of facial expressions;
    determining, by the one or more processors, that the facial expression of the user is a facial expression of fear; and
    in response to determining that the facial expression of the user is the facial expression of fear, switching, by the drone on-board computer, the aerial drone from manual mode to autonomous mode, wherein the aerial drone operates autonomously while in autonomous mode.

2. The method of claim 1, further comprising:
    analyzing, by one or more processors, a video feed from the drone camera, wherein said analyzing identifies a type of physical environment occupied by the user; and
    determining, by one or more processors, the particular type of recreational activity based on the type of physical environment occupied by the user.

3. The method of claim 1, further comprising:
  detecting, by the drone camera, a predefined anomalous physical action by the user; and
  in response to detecting the predefined anomalous physical action by the user, adjusting, by the drone on-board computer, a type of monitoring performed by the drone camera.

4. The method of claim 1, further comprising:
  detecting, by the drone camera, a predefined anomalous physical action by the user; and
  in response to detecting the predefined anomalous physical action by the user, transmitting, by the drone on-board computer, a video feed from the drone camera to an emergency responder.

5. The method of claim 1, further comprising:
  detecting, by the drone camera, a physical hazard at a location towards which the user is approaching; and
  in response to detecting the physical hazard at the location towards which the user is approaching, transmitting, by a transmitter on the aerial drone, an alert to the user, wherein the alert warns the user of the physical hazard at the location towards which the user is approaching.

6. The method of claim 1, wherein the aerial drone is part of a drone swarm of multiple drones, and wherein the method further comprises:
  detecting, by drone cameras mounted on the drone swarm, a first physical gesture of the user, wherein the first physical gesture identifies a drone subset of the drone swarm;
  detecting, by drone cameras mounted on the drone subset, a second physical gesture of the user, wherein the second physical gesture is specific for an action to be performed by the drone subset; and
  performing, by the drone subset, the action in response to said detecting the second physical gesture of the user.

7. The method of claim 1, further comprising:
  detecting, by the drone camera, an authorization physical gesture by the user, wherein the authorization physical gesture is a predefined physical gesture that authorizes the user to take control of the aerial drone, and wherein the authorization physical gesture is a predefined sequence of hand and arm movements made by the user moving his hand and arm through the air; and
  in response to the drone camera detecting the authorization physical gesture by the user, transferring, by the drone on-board computer on the aerial drone, control of the aerial drone to the user.

8. The method of claim 1, further comprising:
  identifying, by one or more sensors, an aerial obstacle to the aerial drone; and
  adjusting, by the drone on-board computer, a flight path of the aerial drone in order to avoid the aerial obstacle.

9. The method of claim 1, wherein said adjusting the operations of the aerial drone comprises:
  switching, by the drone on-board computer, the aerial drone from a first mode to a second mode, wherein the first mode causes the aerial drone to perform a first set of actions, and the second mode causes the aerial drone to perform a second set of actions that is different from the first set of actions.

10. The method of claim 1, wherein lift for the aerial drone is initially being provided by an internal combustion engine on the aerial drone, and wherein the method further comprises:
  observing, by the drone camera, a noise abatement gesture by the user, wherein the noise abatement gesture indicates a desire of the user for the aerial drone to operate at a reduced noise level; and
  in response to observing the noise abatement gesture, powering off, by the drone on-board computer, the internal combustion engine and powering on, by the drone on-board computer, an electric motor on the aerial drone, wherein the electric motor provides the lift for the aerial drone.

11. The method of claim 1, further comprising:
  detecting, by the drone camera, a set of lip movements of the user;
  comparing, by the one or more processors, the set of lip movements of the user to a database of lip movements;
  determining, by the one or more processors, that the set of lip movements of the user is a command for the aerial drone;
  converting, by one or more processors, the command for the aerial drone into a set of executable instructions for the aerial drone; and
  executing, by the drone on-board computer, the set of executable instructions in order to perform said adjusting operations of the aerial drone.

12. The method of claim 1, further comprising:
  detecting, by the drone camera, a facial expression of the user;
  comparing, by the one or more processors, the facial expression of the user to a database of facial expressions;
  determining, by the one or more processors, that the facial expression of the user is a facial expression of pain; and
  in response to determining that the facial expression of the user is the facial expression of pain, transmitting, from the aerial drone, a call for emergency medical help to an emergency health care provider.

13. The method of claim 1, further comprising:
  observing, by the drone camera, a concealment aerial maneuver physical gesture by the user; and
  in response to observing the concealment aerial maneuver physical gesture by the user, performing, by the aerial drone, a concealment aerial maneuver that moves the aerial drone to a location in which the aerial drone is concealed from the user.

14. A computer program product to control movement and to adjust operations of an aerial drone, the computer program product comprising a non-transitory computer readable storage medium having program code embodied therewith, the program code readable and executable by a processor to perform a method comprising:
  observing, by a drone camera mounted on an aerial drone, an aerial maneuver physical gesture by a user;
  performing, by the aerial drone, an aerial maneuver that correlates to the aerial maneuver physical gesture in response to the drone camera observing the aerial maneuver physical gesture by the user;
  observing, by the drone camera, the user performing a physical action;
  associating the physical action with a particular type of recreational activity;
  adjusting, by a drone on-board computer, operations of the aerial drone based on the particular type of recreational activity;
  placing, by the drone on-board computer, the aerial drone in manual mode, wherein the aerial drone is manually controlled by the user when in the manual mode;
  detecting, by the drone camera, a facial expression of the user;

comparing the facial expression of the user to a database of facial expressions;

determining that the facial expression of the user is a facial expression of fear; and in response to determining that the facial expression of the user is the facial expression of fear, switching, by the drone on-board computer, the aerial drone from manual mode to autonomous mode, wherein the aerial drone operates autonomously while in autonomous mode.

15. The computer program product of claim 14, wherein the method further comprises:

analyzing a video feed from the drone camera, wherein said analyzing identifies a type of physical environment occupied by the user; and determining the particular type of recreational activity based on the type of physical environment occupied by the user.

16. The computer program product of claim 14, wherein the method further comprises:

detecting, by the drone camera, a predefined anomalous physical action by the user; and in response to detecting the predefined anomalous physical action by the user, adjusting, by the drone on-board computer, a type of monitoring performed by the drone camera.

17. The computer program product of claim 14, wherein the method further comprises:

detecting, by the drone camera, a predefined anomalous physical action by the user; and in response to detecting the predefined anomalous physical action by the user, transmitting, by the drone on-board computer, a video feed from the drone camera to an emergency responder.

18. The computer program product of claim 14, wherein the program code is provided and executed as a service in a cloud environment.

19. A computer system comprising:

a processor, a computer readable memory, and a non-transitory computer readable storage medium;

first program instructions to observe, by a drone camera mounted on an aerial drone, an aerial maneuver physical gesture by a user;

second program instructions to perform, by the aerial drone, an aerial maneuver that correlates to the aerial maneuver physical gesture in response to the drone camera observing the aerial maneuver physical gesture by the user;

third program instructions to observe, by the drone camera, the user performing a physical action;

fourth program instructions to associate the physical action with a particular type of recreational activity;

fifth program instructions to adjust, by a drone on-board computer, an operation of the aerial drone based on the particular type of recreational activity;

sixth program instructions to place, by the drone on-board computer, the aerial drone in manual mode, wherein the aerial drone is manually controlled by the user when in the manual mode;

seventh program instructions to detect, by the drone camera, a facial expression of the user;

eighth program instructions to compare the facial expression of the user to a database of facial expressions;

ninth program instructions to determine that the facial expression of the user is a facial expression of fear; and tenth program instructions to, in response to determining that the facial expression of the user is the facial expression of fear, switch, by the drone on-board computer, the aerial drone from manual mode to autonomous mode, wherein the aerial drone operates autonomously while in autonomous mode; and wherein the first, second, third, fourth, fifth, sixth, seventh, eighth, ninth, and tenth program instructions are stored on the non-transitory computer readable storage medium for execution by one or more processors via the computer readable memory.

* * * * *